United States Patent
Gignac et al.

(10) Patent No.: US 10,160,274 B1
(45) Date of Patent: Dec. 25, 2018

(54) METHOD AND APPARATUS THAT GENERATE POSITION INDICATORS FOR TOWABLE OBJECT

(71) Applicant: GM GLOBAL TECHNOLOGY OPERATIONS LLC, Detroit, MI (US)

(72) Inventors: Donald R. Gignac, Waterford, MI (US); Allan K. Lewis, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/790,567

(22) Filed: Oct. 23, 2017

(51) Int. Cl.
  *B60D 1/58* (2006.01)
  *B60R 1/00* (2006.01)
  *G06T 11/60* (2006.01)

(52) U.S. Cl.
  CPC .............. *B60D 1/58* (2013.01); *B60R 1/002* (2013.01); *G06T 11/60* (2013.01)

(58) Field of Classification Search
  CPC ...... B60D 1/58; G05D 1/0246; G05D 1/0212; B62D 13/00; B60R 11/04; B60R 1/00
  USPC .......................................................... 340/431
  See application file for complete search history.

(56) References Cited

U.S. PATENT DOCUMENTS

| | | | | |
|---|---|---|---|---|
| 8,888,121 | B2* | 11/2014 | Trevino | B60D 1/36 280/477 |
| 2008/0231701 | A1* | 9/2008 | Greenwood | B60R 1/00 348/148 |
| 2015/0013838 | A1* | 1/2015 | Polzin | B67D 7/845 141/94 |
| 2015/0057903 | A1* | 2/2015 | Rhode | B60T 8/1708 701/70 |
| 2015/0115571 | A1* | 4/2015 | Zhang | B60D 1/06 280/477 |
| 2016/0052548 | A1* | 2/2016 | Singh | B60D 1/36 701/37 |

* cited by examiner

*Primary Examiner* — Omar Casillashernandez

(57) ABSTRACT

A method and apparatus that provide position indicators for features of a towable object. The method includes obtaining position information corresponding to a feature of a towable object, converting the position information to feature display information corresponding to a position of the feature on a display, and displaying an element indicating the position of the feature on the display.

14 Claims, 5 Drawing Sheets

METHOD AND APPARATUS THAT GENERATE POSITION INDICATORS FOR TOWABLE OBJECT

INTRODUCTION

Apparatuses and methods consistent with exemplary embodiments relate to displaying graphical indicators on a display. More particularly, apparatuses and methods consistent with exemplary embodiments relate to displaying graphical indicators that assist an operator.

SUMMARY

One or more exemplary embodiments provide a method and an apparatus that generate and display graphical indicators corresponding to features of a towable object. More particularly, one or more exemplary embodiments provide a method and an apparatus that display graphical position indicators corresponding to features of a towable object over an image of the towable object provided by sensors facing the towable object.

According to an aspect of an exemplary embodiment, a method for providing position indicators for features of a towable object is provided. The method includes obtaining position information corresponding to a feature of a towable object, converting the position information to feature display information corresponding to a position of the feature on a display; and displaying an element indicating the position of the feature on the display.

The method may also include adjusting a position, a rotation, or a size of the displayed element based on: an articulation angle of the towable object; or a position of the towable object with respect to a vehicle towing the towable object.

The obtaining position information corresponding to the feature of the towable object may include obtaining one or more from among a dimension of the towable object, a distance from the feature to a front or back of the towable object, and a distance between the towable object and a vehicle towing the towable object.

The obtaining position information corresponding to the feature of a towable object may include calculating an articulation angle between the towable object and a vehicle.

The feature may include one or more from among a sewage fitting, a grey water outlet, a fresh water outlet, an electrical outlet, a fuel door, and a door location.

The displaying the element indicating the position of the feature on the display comprises displaying a graphical element indicating a type of the feature and a position of the feature.

The method may include obtaining an image of the towable object from one or more sensors facing the towable object.

The displaying the element indicating the position of the feature on the display may include overlaying the element on the image of the towable object obtained from the one or more sensors.

The obtaining position information corresponding to the feature of a towable object comprises processing the image to calculate one or more from among: an articulation angle between the towable object and a vehicle; a dimension of the towable object; and a distance between the towable object and a vehicle.

According to an aspect of exemplary embodiment, an apparatus that provides position indicators for features of a towable object is provided. The apparatus includes at least one memory comprising computer executable instructions; and at least one processor configured to read and execute the computer executable instructions. The computer executable instructions may cause the at least one processor to obtain position information corresponding to a feature of a towable object, convert the position information to feature display information corresponding to a position of the feature on a display, and display an element indicating the position of the feature on the display.

The computer executable instructions may cause the at least one processor to adjust a position, a rotation, or a size of the displayed element on the display based on: an articulation angle of the towable object; or a position of the towable object with respect to a vehicle towing the towable object.

The computer executable instructions may cause the at least one processor to obtain position information corresponding to the feature of the towable object by obtaining one or more from among a dimension of the towable object, a distance from the feature to a front or back of the towable object, and a distance between the towable object and a vehicle towing the towable object.

The computer executable instructions may cause the at least one processor to obtain position information corresponding to the feature of a towable object by calculating an articulation angle between the towable object and a vehicle.

The feature may include one or more from among a sewage fitting, a grey water outlet, a fresh water outlet, an electrical outlet, a fuel door, and a door location.

The computer executable instructions may cause the at least one processor to display the element indicating the position of the feature on the display by displaying a graphical element indicating a type of the feature and a position of the feature.

The apparatus may include one or more sensors facing the towable object, and the computer executable instructions may cause the at least one processor to obtain the image of the towable object from one or more sensors facing the towable object.

The computer executable instructions may cause the at least one processor to display the element indicating the position of the feature on the display by overlaying the element on the image of the towable object obtained from the one or more sensors.

The computer executable instructions may cause the at least one processor to obtain position information corresponding to the feature of a towable object by processing the image to calculate one or more from among: an articulation angle between the towable object and a vehicle; a dimension of the towable object; and a distance between the towable object and a vehicle.

The computer executable instructions may cause the at least one processor to translate feature display information according to an articulation angle between the towable object and a vehicle.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
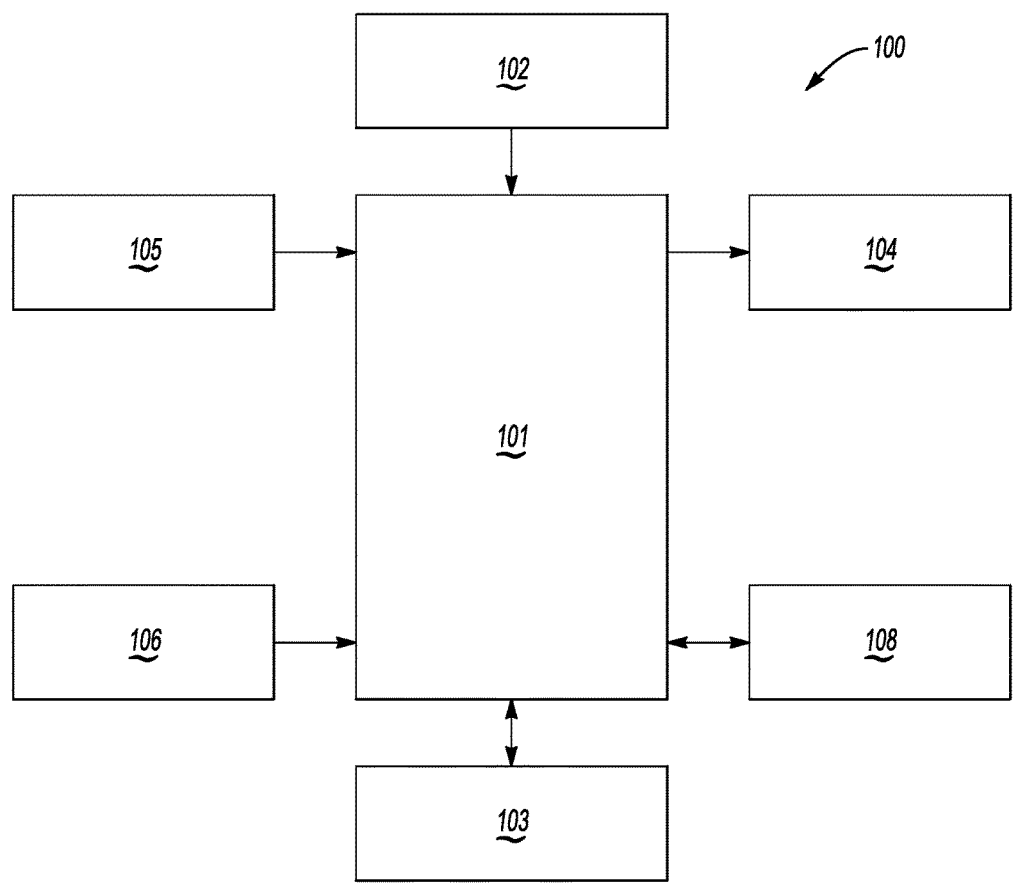
FIG. 1 shows a block diagram of an apparatus that provides position indicators for features of a towable object according to an exemplary embodiment.

An apparatus and method that provide position indicators for features of a towable object will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles such as trucks or other machines may include displays that provide views of an area outside of the vehicle or machine. The display may display an image of an area around the vehicle captured by a camera or sensor facing the area outside of the vehicle. Examples of displays may include a center stack display, a side mirror display or a rear view mirror display that output the image provided by a camera facing the area behind the vehicle or machine. These displays may be used to guide the vehicle or machine to a location or a position.

The display may overlay guidelines or graphical elements on the displayed image of the area outside of the vehicle to assist an operator in directing, positioning, guiding or steering a vehicle. The image of the area outside of the vehicle may be provided by, in one example, a rear view camera such as a rear vision back up camera located on a tailgate, a trunk, or bumper of a vehicle. The guidelines or graphical elements may animated or transformed to reflect the direction, position, movement or potential movement of the vehicle as well as the slope, vertical profile, shape, topography of the path of travel of the vehicle.

In certain circumstances, a vehicle may be towing or attached to a towable object such as a trailer or a boat. The towable object may have elements, e.g., fuel doors, sewage lines, electrical connectors, that need to be properly aligned or positioned with respect to an external object. However, it may be difficult for the operator of the vehicle to properly position the elements of the towable object using solely mirrors or an image provided by rear view sensor or camera. In order to address this issue, position indicators corresponding to a location of the features of the towable object may be displayed on the display. The position indicators may be assist the operator in positioning the features at a desired position with respect to external objects or structures. Examples of external objects or structures include a wall, a gas pump, a water line connection, a sewage line connection, etc.

FIG. 1 shows a block diagram of an apparatus that provides position indicators for features of a towable object 100 according to an exemplary embodiment. As shown in FIG. 1, the apparatus that provides position indicators for features of a towable object 100, according to an exemplary embodiment, includes a controller 101, a power supply 102, a storage 103, an output 104, a sensor 105, a user input 106, and a communication device 108. However, the apparatus that provides position indicators for features of a towable object 100 is not limited to the aforementioned configuration and may be configured to include additional elements and/or omit one or more of the aforementioned elements. The apparatus that provides position indicators for features of a towable object 100 may be implemented as part of a vehicle, as a standalone component, as a hybrid between an on vehicle and off vehicle device, or in another computing device.

The controller 101 controls the overall operation and function of the apparatus that provides position indicators for features of a towable object 100. The controller 101 may control one or more of a storage 103, an output 104, a sensor 105, a user input 106, and a communication device 108 of the apparatus that provides position indicators for features of a towable object 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 may be configured to send and/or receive information from one or more of the storage 103, the output 104, the sensor 105, the user input 106, and the communication device 108 of the apparatus that provides position indicators for features of a towable object 100. The information may be sent and received via a bus or network, or may be directly read or written to/from one or more of the storage 103, the output 104, the sensor 105, the user input 106, and the communication device 108 of the apparatus that provides position indicators for features of a towable object 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the sensor 105, the user input 106, and the communication device 108, of the apparatus that provides position indicators for features of a towable object 100. The power supply 102 may include one or more from among a battery, an outlet, a capacitor, a solar energy cell, a generator, a wind energy device, an alternator, etc.

The storage 103 is configured for storing information and retrieving information used by the apparatus that provides position indicators for features of a towable object 100. The storage 103 may be controlled by the controller 101 to store information received from the sensor 105 and to retrieve the stored information. The storage may store position information corresponding to a feature of a towable object or feature display information corresponding to a position of the feature on a display. In addition, the storage 103 may also include the computer instructions configured to be executed by a processor to perform the functions of the apparatus that provides position indicators for features of a towable object 100.

The position information may include a dimension of the towable object, an articulation angle between a vehicle and a towable object, a position of the towable object with respect to a vehicle towing the towable object, a distance from the feature to a front or back of the towable object, and a distance between the towable object and a vehicle towing the towable object. In an example, the articulation angle may be an angle between a line through a center of a vehicle and a hitch or a connector of a towable object.

The feature display information corresponding to a position of the feature on a display indicates a location where a graphical element corresponding to the feature is to be displayed. The feature display information may be adjusted based on a position of the feature of the towable object, the position of the towable object, and an articulation angle between the towable object and a vehicle.

The feature may be one or more from among a sewage fitting, a grey water outlet, a fresh water outlet, an electrical outlet, a fuel door, and a door location. The position information and feature display information may be received or derived from information provided by sensor 105. For example, sensor 105 may provide information one or more images taken by the sensor 105 or distances between the sensor 105 and a towable object or a feature of a towable object.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that provides position indicators for features of a towable object 100. The output 104 may include one or more from among a speaker, an audible transducer, a display, a centrally-located display, a head up display, a windshield display, a haptic feedback device, a vibration device, a tactile feedback device, a tap-feedback device, a holographic display, an instrument light, an instrument panel display, a center stack display, a rear view mirror display, a side view mirror display, an indicator light, etc.

According to one example, the output 104 may be one or more from among a center stack display, a side mirror display, or a rear view mirror display. The output 104 may be configured to output an image from the sensor 105 and display guidelines or an element corresponding to feature display information. In addition, the output 104 may output notification including one or more from among an audible notification, a light notification, and a display notification.

The user input 106 is configured to provide information and commands to the apparatus that provides position indicators for features of a towable object 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may be configured to receive a user input to input position information corresponding to a feature of a towable object, one or more dimensions of a towable object, a position of the towable object with respect to a vehicle towing the towable object, a distance from the feature to a front or back of the towable object, and a distance between the towable object and a vehicle towing the towable object.

The sensor 105 may be one or more of a rear facing camera, a camera, an infrared camera, a night vision camera, an ultrasonic sensor, a radar, an accelerometer, an infrared sensor, a laser sensor, a LIDAR, etc. According to an example, the sensor 105 may be mounted on a tailgate of a truck, a rear view mirror, a hood, a dashboard, a side view mirror, a trunk, a high mount stop light or a bumper of the vehicle or machine. The images or information from the sensor 105 may be analyzed to determine position information corresponding to a feature of a towable object and/or position information of the towable object.

The communication device 108 may be used by apparatus that provides position indicators for features of a towable object 100 to communicate with various types of external apparatuses according to various communication methods. The communication device 108 may be used to receive position information corresponding to a feature of a towable object and/or position information of the towable object from the sensor 105. In addition, the communication device 108 may be used to send image information to the output 104 to display the image information and the generated guidelines that are overlaid onto the image information.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an example, the controller 101 of the apparatus that provides position indicators for features of a towable object 100 may be configured to obtain position information corresponding to a feature of a towable object, convert the position information to feature display information corresponding to a position of the feature on a display, and display an element indicating the position of the feature on the display. The feature of the towable object may be one or more from among a sewage fitting, a grey water outlet, a fresh water outlet, an electrical outlet, a fuel door, and a door location. The towable object may include recreational vehicle trailers, boats, utility trailers, etc. The features may correspond to one or more features of the recreational vehicle trailers, boats, utility trailers, etc.

In addition, the features may be set by a user input received from the user input 106. For example, the user may enter a feature and a location of the feature. Moreover, the user may select an indicator design or a label for an indicator of the feature through the user input 106.

According to an example, the controller 101 of the apparatus that provides position indicators for features of a towable object 100 may be configured to adjust a position or a size of the displayed element on the display based on: an articulation angle of the towable object; or a position of the towable object with respect to a vehicle towing the towable object.

According to an example, the controller 101 of the apparatus that provides position indicators for features of a towable object 100 may be configured to obtain position information corresponding to the feature of the towable object by obtaining one or more from among a dimension of the towable object, a distance from the feature to a front or back of the towable object, and a distance between the towable object and a vehicle towing the towable object.

According to an example, the controller 101 of the apparatus that provides position indicators for features of a towable object 100 may be configured to obtain position information corresponding to the feature of a towable object by calculating an articulation angle between the towable object and a vehicle. The controller 101 may also be configured to translate feature display information according to an articulation angle between the towable object and a vehicle.

According to an example, the controller 101 of the apparatus that provides position indicators for features of a towable object 100 may be configured to control to display the element indicating the position of the feature on the display by displaying a graphical element indicating a type of the feature and a position of the feature.

According to an example, the controller 101 of the apparatus that provides position indicators for features of a towable object 100 may be configured to obtain the image of the towable object from one or more sensors facing the towable object and display the element indicating the position of the feature on the display by overlaying the element on the image of the towable object obtained from the one or more sensors. The controller 101 may obtain position information corresponding to the feature of a towable object by processing the image to calculate one or more from among: an articulation angle between the towable object and a vehicle; a dimension of the towable object; and a distance between the towable object and a vehicle.

Figure 2:
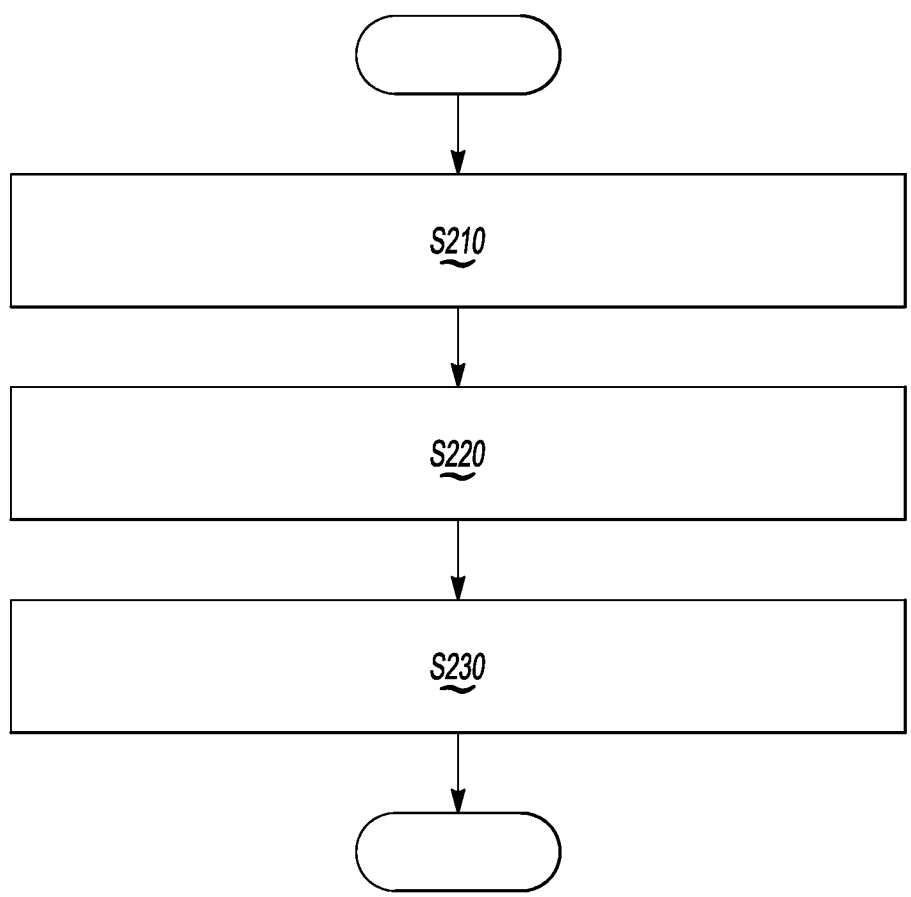
FIG. 2 shows a flowchart for a method of providing position indicators for features of a towable object according to an exemplary embodiment.

FIG. 2 shows a flowchart for a method of providing position indicators for features of a towable object according to an exemplary embodiment. The method of FIG. 2 may be performed by the apparatus that provides position indicators for features of a towable object 100 or may be encoded into a computer readable medium as instructions that are executable by a computer to perform the method.

Referring to FIG. 2, position information corresponding to features of a towable object is obtained, retrieved or received in operation 210. The position information is converted to feature display information corresponding to the location or position of the feature of the towable object on the display in operation S220. A display element indicating the position or location of the feature of the towable object is displayed on a display in operation S230.

Figure 3:
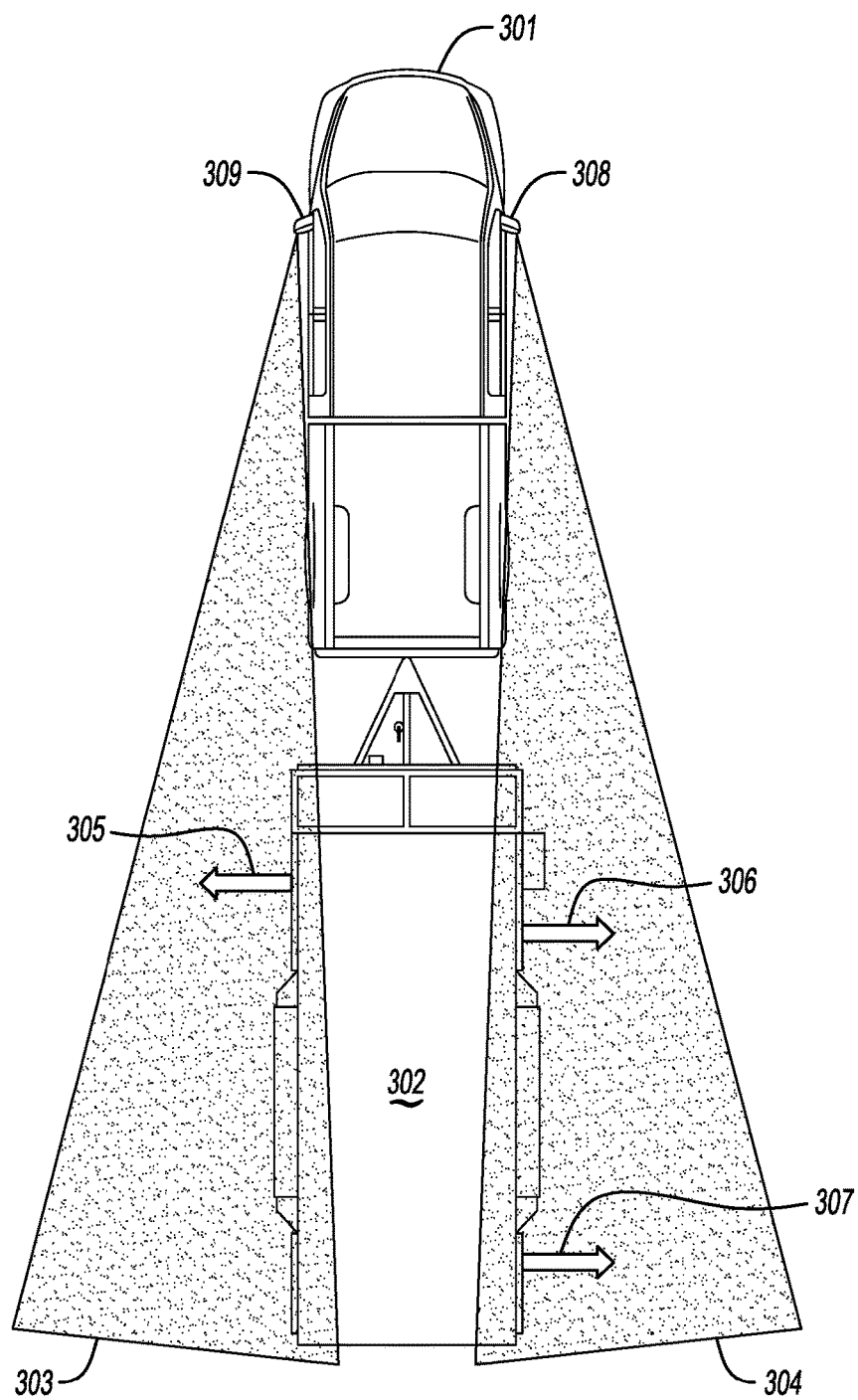
FIG. 3 shows an illustration of an overhead view of a vehicle, towable object, and the features of the towable object according to an aspect of an exemplary embodiment.

FIG. 3 shows an illustration of an overhead view of a vehicle, towable object, and the features of the towable object according to an aspect of an exemplary embodiment.

Referring to FIG. 3, an example of an image to be displayed on a display in a vehicle 301 showing the position of the features of the towable object 302 is shown. The vehicle includes two sensors 308 and 309, which are used to sense feature position information as well as a position of a towable object. The information from sensors 308 and 309 as well as other sensors may be used to provide the image to be displayed on the display. The sensors may provide information on areas 304 and 303, respectively.

The door 305, electrical outlet 306 and grey water outlet 307 may be indicated by a display element such as an arrow, highlight, rectangle, etc. The position of the display element corresponds to the position of the feature on the towable object. The display elements may be distinguishable from each other by color, shading, animation, shape, etc. to indicate the different features of the towable object. The display elements may be used by an operator of a vehicle to position or align the door 305, electrical outlet 306 and grey water outlet 307 with external objects or structures or to determine the position of the towable object 302 with respect to an external object or structure.

Figure 4:
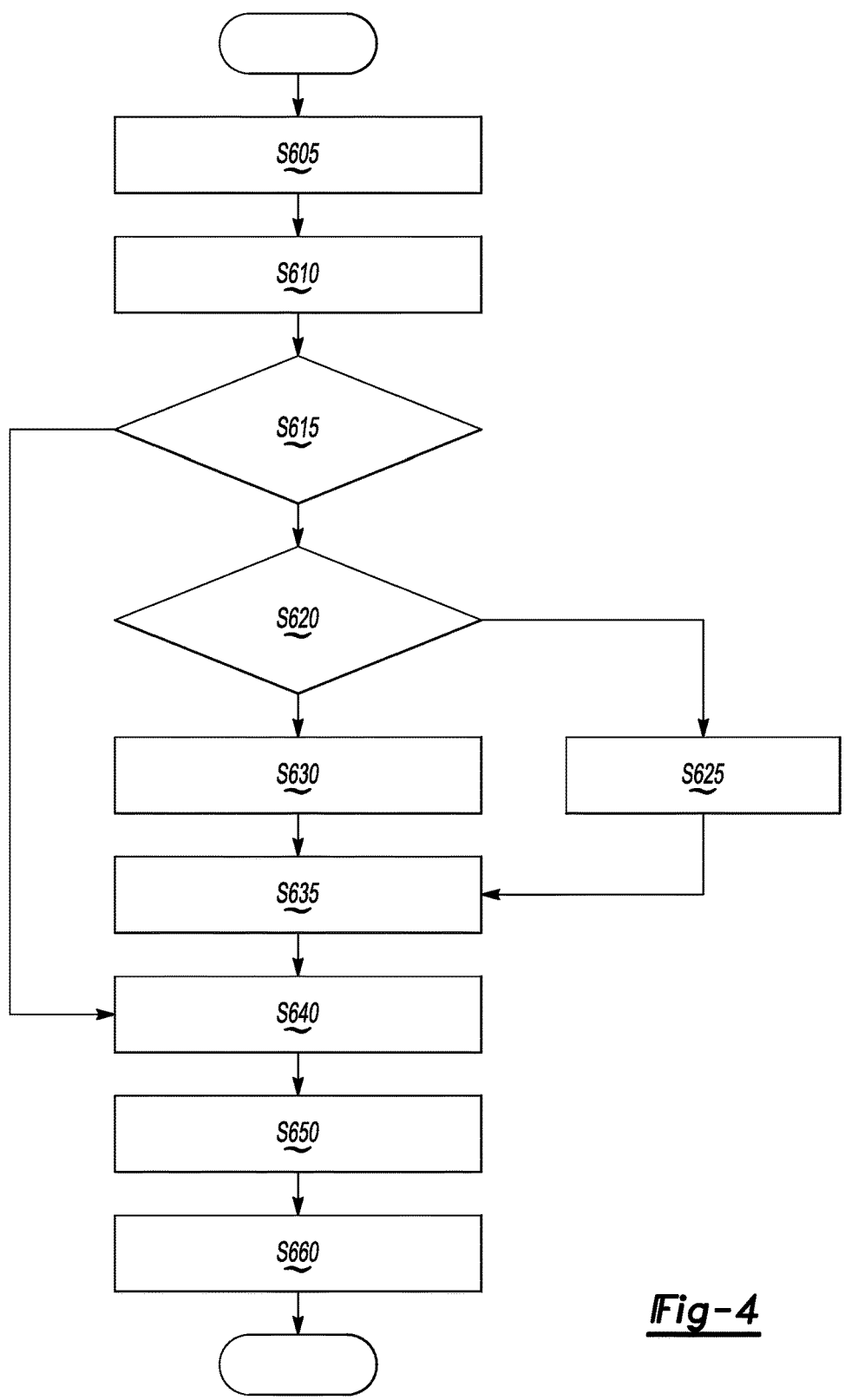
FIG. 4 shows a flowchart for method of determining feature display information according to an aspect of an exemplary embodiment.

FIG. 4 shows a flowchart for method of determining feature display information according to an aspect of an exemplary embodiment. The method of FIG. 4 may be performed by the apparatus that provides position indicators for features of a towable object 100 or may be encoded into a computer readable medium as instructions that are executable by a computer to perform the method.

Referring to FIG. 4, a towable object is detected in the field of view of a sensor in operation S605 and the towable object to vehicle articulation angle is calculated in operation S610. If the articulation angle is equal to zero (operation S615—Yes), then the coordinates of the towable object are determined and the display element is overlaid onto an image of the towable object in operation S640. The starting edge of the overlaid display element is set based on the width of the towable object in operation S650 and the overlaid display element is rendered with feature indicators in operation S660.

If the articulation angle is not equal to zero (operation S615—No), i.e. greater or less than zero, then this indicates that the towable object is positioned towards the left or right of the view port. In operation S620, it is determined whether articulation angle is greater than zero. If the articulation angle is greater than zero (operation S620—Yes), a viewport of the towable object is biased to the right in operation S625. If the articulation angle is less than zero (operation S620—No), a viewport of the towable object is biased to the left in operation S630. In operation S635, coordinates are pulled from the articulation angle look up table and then in operation S640 the coordinates of the towable object are determined and used to align the overlaid image onto an image of the towable object. The starting edge of the overlaid display element is set based on the width of the towable object in operation S650 and the overlaid display element is rendered with feature indicators in operation S660.

Figure 5:
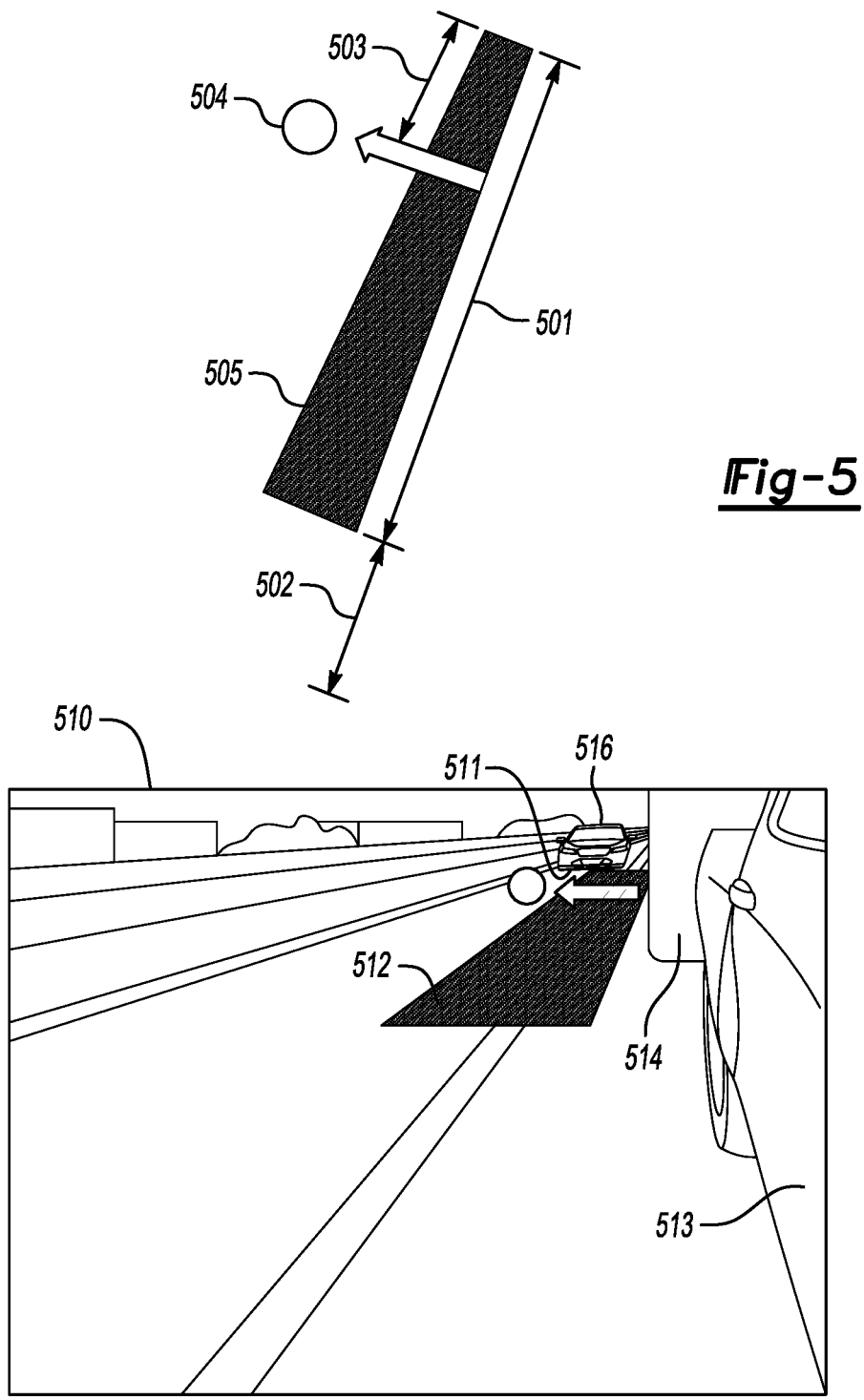
FIG. 5 shows illustrations of graphical indicators corresponding to a towable object and features of a towable object according to an aspect of an exemplary embodiment.

FIG. 5 shows illustrations of graphical indicators corresponding to a towable object and features of a towable object according to an aspect of an exemplary embodiment.

Referring to FIG. 5, an illustration of a towable object length 501 and a towable object connector length 502 is shown. The towable object connector length 502 may correspond to a distance between a towable object and a vehicle. A feature 504 of the towable object may be a distance 503 from a back of the towable object or the front of a towable object. This distance 503 may be used to determine a position of the feature with respect to the towable object and a vehicle. Moreover, the overlay 505 may be displayed to start from a front edge of the towable object and end at a back edge of the towable object. The position of the front edge of the towable object may be determined by adding the towable object connector length 502 to the position of the back edge of a vehicle.

Illustration 510 shows an example of an image provided by sensor 105. The image shows a vehicle 513 and towable object 514. The overlay graphic 512 and display feature indicator graphic 511 may show an operator the position of a feature on the towable object and/or the towable object 514 with respect to external objects such as a second vehicle 516. This may help an operator better position and control a vehicle 513 and a towable object 514. The overlay graphic 512 and display feature indicator graphic 511 may be a display element as described above.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for providing position indicators for features of a towable object, the method comprising:
obtaining an image of a towable object from one or more sensors facing the towable object;
obtaining position information corresponding to a feature of the towable object;
converting the position information to feature display information corresponding to a position of the feature on a display; and
displaying an element indicating the position of the feature on the display by overlaying the element on the image of the towable object obtained from the one or more sensors,
wherein the feature comprises one or more from among a sewage fitting, a grey water outlet, a fresh water outlet, an electrical outlet, a fuel door, and a door location.

2. The method of claim 1, further comprising:
adjusting a position, a rotation, or a size of the displayed element based on: an articulation angle of the towable object; or a position of the towable object with respect to a vehicle towing the towable object.

3. The method of claim 1, wherein the obtaining position information corresponding to the feature of the towable object comprises:
obtaining one or more from among a dimension of the towable object, a distance from the feature to a front or back of the towable object, and a distance between the towable object and a vehicle towing the towable object.

4. The method of claim 1, wherein the obtaining position information corresponding to the feature of the towable object comprises calculating an articulation angle between the towable object and a vehicle.

5. The method of claim 1, wherein the displaying the element indicating the position of the feature on the display comprises displaying a graphical element indicating a type of the feature and a position of the feature.

6. The method of claim 1, wherein the obtaining position information corresponding to the feature of the towable object comprises processing the image to calculate one or more from among: an articulation angle between the towable object and a vehicle; a dimension of the towable object; and a distance between the towable object and a vehicle.

7. A non-transitory computer readable medium comprising computer executable instructions executable by a processor to perform the method of claim 1.

8. An apparatus that provides position indicators for features of a towable object, the apparatus comprising:
at least one memory comprising computer executable instructions; and
at least one processor configured to read and execute the computer executable instructions, the computer executable instructions causing the at least one processor to:
obtain an image of a towable object from one or more sensors facing the towable object;
obtain position information corresponding to a feature of the towable object;
convert the position information to feature display information corresponding to a position of the feature on a display; and
display an element indicating the position of the feature on the display by overlaying the element on the image of the towable object obtained from the one or more sensors,
wherein the feature comprises one or more from among a sewage fitting, a grey water outlet, a fresh water outlet, an electrical outlet, a fuel door, and a door location.

9. The apparatus of claim 8, wherein the computer executable instructions cause the at least one processor to adjust a position, a rotation, or a size of the displayed element on the display based on: an articulation angle of the towable object; or a position of the towable object with respect to a vehicle towing the towable object.

10. The apparatus of claim 8, wherein the computer executable instructions cause the at least one processor to obtain position information corresponding to the feature of the towable object by obtaining one or more from among a dimension of the towable object, a distance from the feature to a front or back of the towable object, and a distance between the towable object and a vehicle towing the towable object.

11. The apparatus of claim 8, wherein the computer executable instructions cause the at least one processor to obtain position information corresponding to the feature of the towable object by calculating an articulation angle between the towable object and a vehicle.

12. The apparatus of claim 8, wherein the computer executable instructions cause the at least one processor to display the element indicating the position of the feature on the display by displaying a graphical element indicating a type of the feature and a position of the feature.

13. The apparatus of claim 8, wherein the computer executable instructions cause the at least one processor to obtain position information corresponding to the feature of the towable object by processing the image to calculate one or more from among: an articulation angle between the towable object and a vehicle; a dimension of the towable object; and a distance between the towable object and a vehicle.

14. The apparatus of claim 8, wherein the computer executable instructions cause the at least one processor to translate feature display information according to an articulation angle between the towable object and a vehicle.

* * * * *